United States Patent
Tang et al.

(10) Patent No.: US 7,330,610 B2
(45) Date of Patent: Feb. 12, 2008

(54) SYSTEM AND METHOD FOR UPDATING A SIGN-ON LOGO IMAGE FILE IN A COMPUTER

(75) Inventors: Gui-Hua Tang, ShenZhen (CN); Hung-Yuan Tsai, Tu-Cheng (TW); Yi-Ching Weng, Tu-Cheng (TW)

(73) Assignees: Hong Fu Jin Precision Industry (Shenzhen) Co., Ltd., Bao-an District, Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 623 days.

(21) Appl. No.: 10/990,998

(22) Filed: Nov. 17, 2004

(65) Prior Publication Data

US 2005/0220367 A1    Oct. 6, 2005

(30) Foreign Application Priority Data

Mar. 20, 2004    (CN) .................. 2004 1 0026608

(51) Int. Cl.
*G06K 9/03*    (2006.01)
(52) U.S. Cl. .............. 382/309; 382/217; 382/243; 382/305; 713/2; 713/183
(58) Field of Classification Search ............... 382/217, 382/243, 305, 309; 713/2, 180, 183
See application file for complete search history.

(56) References Cited

U.S. PATENT DOCUMENTS

| | | | |
|---|---|---|---|
| 6,154,738 A * | 11/2000 | Call ............................ | 707/4 |
| 6,269,441 B1 | 7/2001 | Lee et al. ..................... | 713/1 |
| 6,493,878 B1 * | 12/2002 | Kassatly ..................... | 725/144 |
| 6,643,652 B2 * | 11/2003 | Helgeson et al. ............. | 707/10 |
| 7,006,881 B1 * | 2/2006 | Hoffberg et al. ............. | 700/83 |
| 7,013,289 B2 * | 3/2006 | Horn et al. ................... | 705/26 |

* cited by examiner

*Primary Examiner*—Yosef Kassa
(74) *Attorney, Agent, or Firm*—Morris Manning Martin LLP; Tim Tingkang Xia, Esq.

(57) ABSTRACT

A system for updating a sign-on logo image file in a computer includes: a storage medium (7) for storing image files; application software (1) for loading a selected image file, converting the selected image file into a designated format image file, and compressing the designated format image file into a corresponding sign-on logo image file; a dynamic link library (DLL) (2) for receiving the sign-on logo image file from the application software; a basic input/output system (BIOS) (4) for receiving the sign-on logo image file from the DLL through a driver model (3) which connects the DLL with the BIOS, determining whether the sign-on logo image file is valid according a size of the sign-on logo image file, and updating the sign-on logo image file in the computer if the sign-on logo image file is valid; and a read only memory (5) for storing the sign-on logo image file. A related method is also disclosed.

14 Claims, 3 Drawing Sheets

SYSTEM AND METHOD FOR UPDATING A SIGN-ON LOGO IMAGE FILE IN A COMPUTER

BACKGROUND OF THE INVENTION

1. Field of the Invention

The present invention relates to a computer data updating system and method, and more particularly to a sign-on logo image file updating system and a method for updating a sign-on image logo file in a computer and displaying the updated logo file.

2. Background of the Invention

A logo image file often referred to as a logo is stored in a computer's memory, and is displayed on a monitor screen when the computer system is turned on. The logo file is also known as a sign-on logo. In a typical personal computer, the sign-on logo is predetermined and stored in the computer's memory, and is displayed on the screen every time the computer is turned on. Since the sign-on logo is fixed prior to shipping of the new computer to a customer, users have no choice but to view the fixed sign-on logo whenever they power on the computer. Many users of the personal computers do not necessarily want to see the same sign-on logo all the time, and would like to change it freely and easily according to individual preference. For example, some consumers such as certain companies and private individuals may want to change the preset sign-on logo to a unique logo image of their own. For instance, a computer producer may want to change the sign-on logo to a new sign-on logo that displays the computer producer's own corporate logo.

To change a current sign-on logo image file, the user must store a designated format compressed graphical image in a random access memory (RAM) to update the current sign-on logo image, and restart the computer to initialize a power-on self test (POST) and display the graphical image during the POST. It is difficult for users to change the sign-on logo, since a modification of memory is required.

In endeavors to solve these problems, recent patents in the art include U.S. Pat. No. 6,269,441 B1 entitled Logo Display Apparatus for a Computer and the Method Thereof, issued on Jul. 31, 2001. This invention refers to a logo display device for a computer and the method thereof which allows a user to optionally select and display a logo image of a system's basic input output system (BIOS).

Although this patent provides several considerable advantages, a user often needs to enter a special interface when a computer initializes a POST, and manually update the sign-on logo during the POST. Then the user must repeat the POST to enter the computer's OS (operating system; such as Windows 98, Windows 2000 or Windows XP). This means that the user cannot change the sign-on logo while he/she is using the computer in the OS. Instead, he/she must restart the computer, which is unduly inconvenient.

Furthermore, many business and company users want to conveniently update sign-on logo images of a large number of local computers from a remote server through a network. The local computers are more easily and conveniently controlled by the remote server when they are running in the OS compared with when they are undergoing the POST.

SUMMARY OF THE INVENTION

An object of the present invention is to provide a system for updating a sign-on logo image file in a computer, which allows a common user to optionally select an image file from a storage medium of the computer, and then update the sign-on logo image file with the selected image file.

Another object of the present invention is to provide a method for updating a sign-on logo image file in a computer and displaying the updated image file, which allows a common user to optionally select an image file from a storage medium of the computer, update the sign-on logo image file with the selected image file, and display the selected image file.

To achieve the first object, a preferred embodiment of a system for updating a sign-on logo image file in a computer is provided. The system has a multi-layer architecture including an application layer, a driver layer, a hardware abstraction layer, and a hardware platform. The application layer includes application software and a dynamic link library (DLL). The application software comprises: an image loading module for loading an image file selected from a storage medium of the computer; an image converting module for converting the selected image file into a designated format image file; an image saving module for saving the designated format image file in the storage medium; an image compressing module for compressing the designated format image file into a sign-on logo image file; a communication module for transmitting the sign-on logo image file to the DLL; and an image previewing module for previewing the selected image file before updating the sign-on logo image file. The driver layer comprises a driver model that connects the DLL with a basic input/output system (BIOS). The hardware abstraction layer comprises the BIOS and a read only memory (ROM). The hardware platform comprises a storage medium, a south bridge, and a CPU.

The application software can be controlled by a remote server through a network, so that a business or company user can update respective sign-on logo images of a multitude of computers at the same time through the network.

To achieve the second object, a method for updating a sign-on logo image file in a computer and displaying the updated image file is provided. The method comprises the steps of: loading a selected image file from a storage medium; converting the selected image file into a designated format image file; compressing the designated format image file into a sign-on logo image file; transmitting the sign-on logo image file to a dynamic link library (DLL); transmitting the sign-on logo image file to a basic input/output system (BIOS) through a driver model; determining whether the sign-on logo image file is valid according to a size of the sign-on logo image file; updating the sign-on logo image file stored in a read only memory (ROM) with the selected image file, if the sign-on logo image file is valid; returning to the step of loading a selected image file, if the sign-on logo image file are not valid; and restarting the computer to display the selected image file.

Other objects, advantages and novel features of the present invention will be drawn from the following detailed description of the preferred embodiment and a preferred method thereof together with the attached drawings, in which:

DETAILED DESCRIPTION OF THE PREFERRED EMBODIMENT

Figure 1:
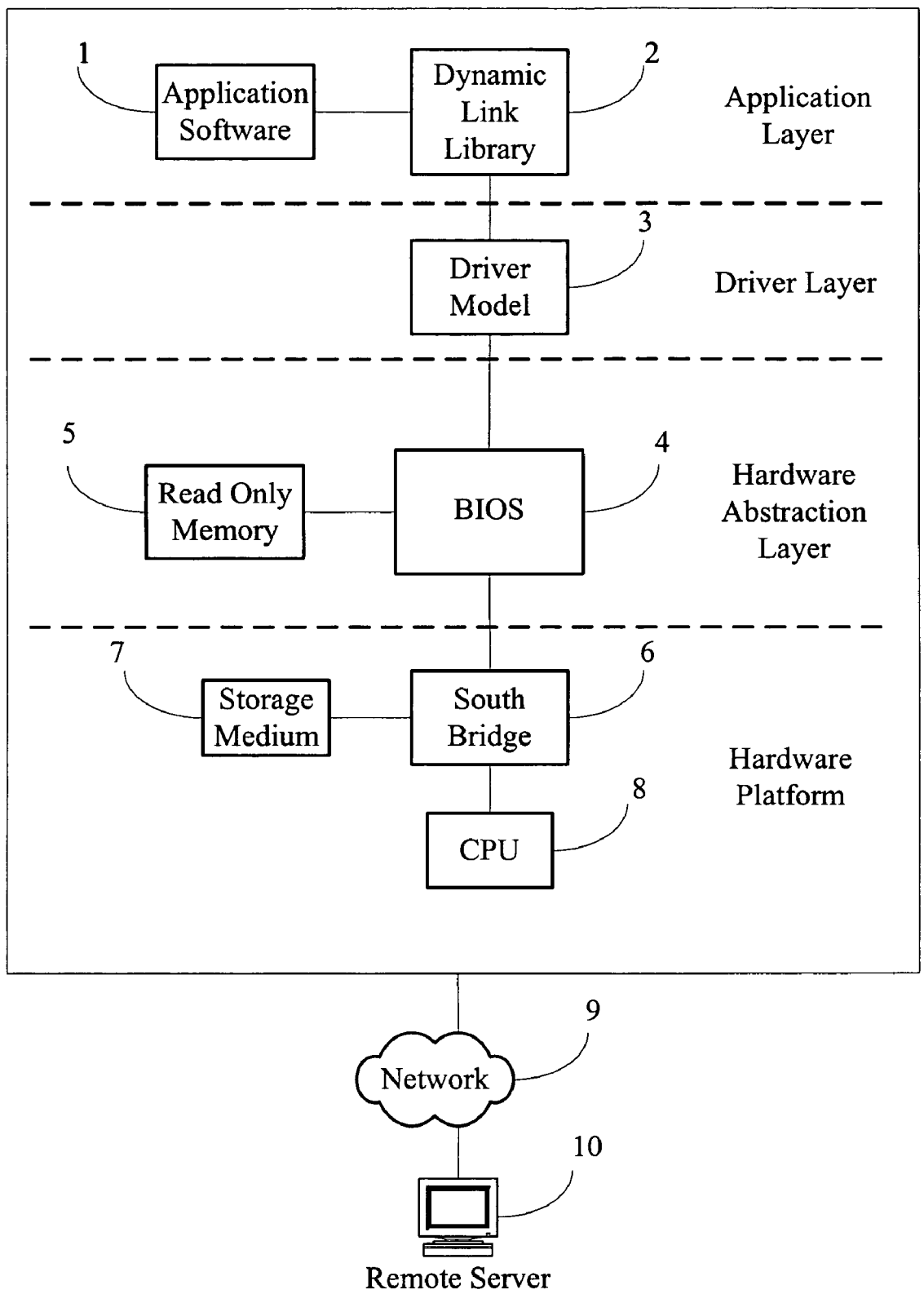
FIG. 1 is a block diagram of hardware and software infrastructure of a system for updating a sign-on logo image file in a computer in accordance with the preferred embodiment of the present invention.

FIG. 1 is a block diagram of hardware and software infrastructure of a system for updating a sign-on logo image file in a computer (hereinafter, "the system"), in accordance with the preferred embodiment of the present invention. The system has a multi-layer architecture including an application layer, a driver layer, a hardware abstraction layer, and a hardware platform. The application layer comprises application software 1 and a dynamic link library (DLL) 2. The driver layer comprises a driver model 3. The hardware abstraction layer comprises a basic input/output system (BIOS) 4 and a read-only memory (ROM) 5. The hardware platform comprises a south bridge 6, a storage medium 7, and a central processing unit (CPU) 8.

The system is connected with a remote server 10 through a network 9. The network 9 is an electronic communications network that supports Transmission Control Protocol and Internet Protocol (TCP/IP). The network 9 can be an intranet, the Internet, or any other suitable type of communications network. The remote server 10 can be a desktop computer, a notebook computer, or a server computer. The remote server 10 controls the application software 1 through the network 9. By this means, users can update sign-on logo image displays of a multitude of remotely located computers (not shown) at the same time.

The application software 1 contains a plurality of function modules installed therein, and provides users with a windowed interface (not shown). The application software 1 loads a selected image file from the storage medium 7, converts the selected image file into a designated format image file, compresses the designated format image file into a sign-on logo image file, such as an Award BMP file (An Award BMP file is used in an Award BIOS in anan EPA format. The EPA format is a proprietary format, and can't be edited by most standard graphics programs), transmits the sign-on logo image file to the DLL 2, and previews the selected image file on the windowed interface. The designated format of the image file contains an image size, an image color value, and an image pixel value. The DLL 2 receives the sign-on logo image file of the selected image file from the application software 1, and transmits the sign-on logo image file to the driver model 3. Then, the driver model 3 transmits the sign-on logo image file of the selected image file to the BIOS 4.

The BIOS 4 is for determining whether the sign-on logo image file is valid according to designated standards of the BIOS 4 (such as a size of the sign-on logo image file), and updating a current sign-on logo image file with the selected image file if the sign-on logo image file is valid. The ROM 5 stores the sign-on logo image file of the selected image file and programs used by the BIOS 4. The south bridge 6 connects the BIOS 4 to the storage medium 7 and the CPU 8. The storage medium 7 stores all kinds of image files before their being converted, and the designated format image files after conversion. The CPU 8 controls the BIOS 4 to update the current sign-on logo image file. The CPU 8 can also respond to and process subsequent requests generated by the application software 1.

Figure 2:
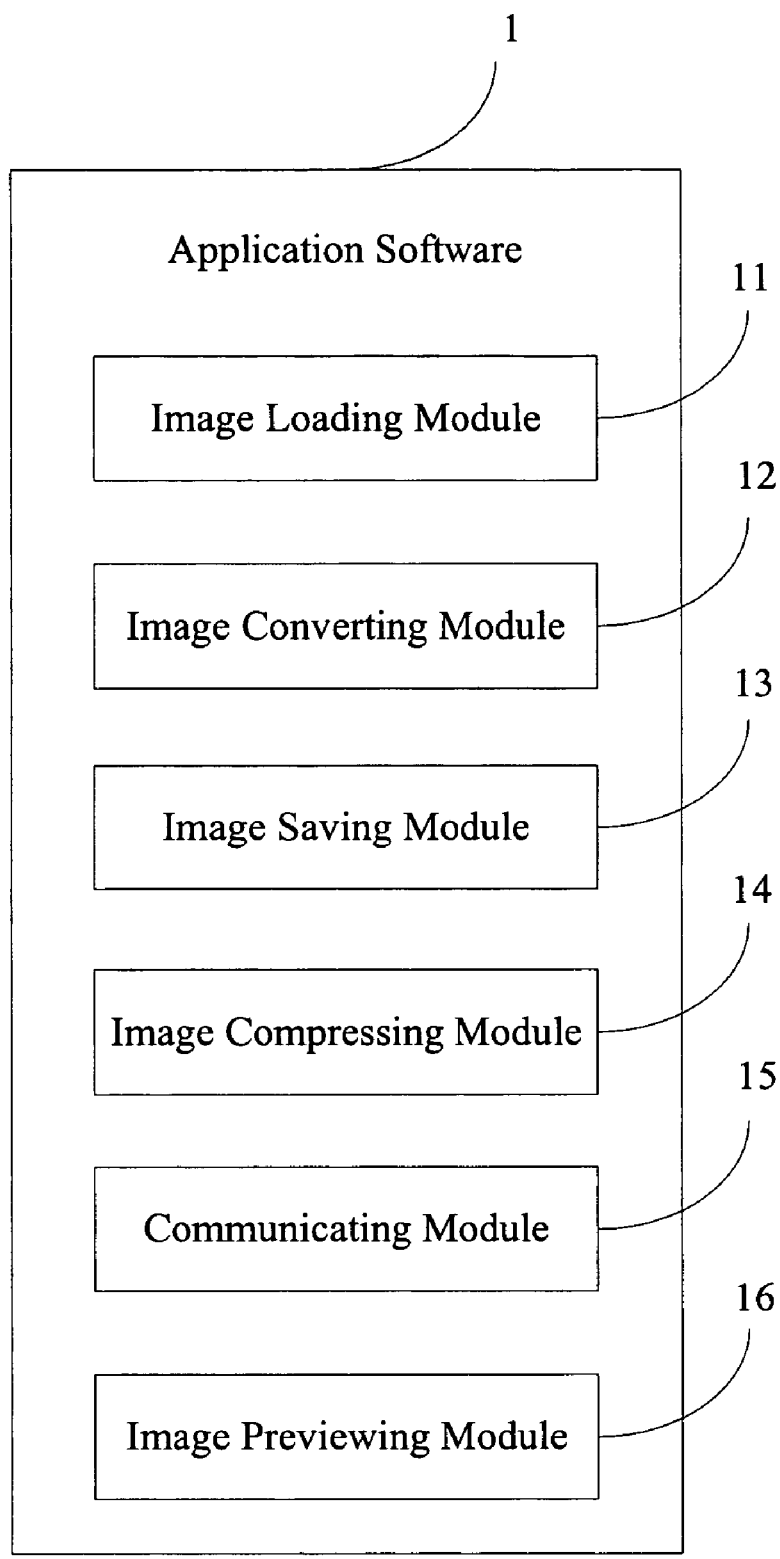
FIG. 2 is a schematic diagram of main function modules of application software of the system of FIG. 1.

FIG. 2 is a schematic diagram of main function modules of the application software 1. The application software 1 comprises an image loading module 11, an image converting module 12, an image saving module 13, an image compressing module 14, a communicating module 15, and an image previewing module 16. The image loading module 11 loads a selected image file from the storage medium 7. The image file can be a file in a certain format such as tif, jpg, bmp, gif and the like. The image converting module 12 converts the selected image file into a designated format image file. The designated format contains an image size, an image color value, and an image pixel value. The image saving module 13 saves the designated format image file in the storage medium 7. The image compressing module 14 compresses the designated format image file into a sign-on logo image file. The communicating module 15 transmits the sign-on logo image file to the DLL 2. The image previewing module 16 previews the selected image file, namely a new sign-on logo image file, on the windowed interface.

Figure 3:
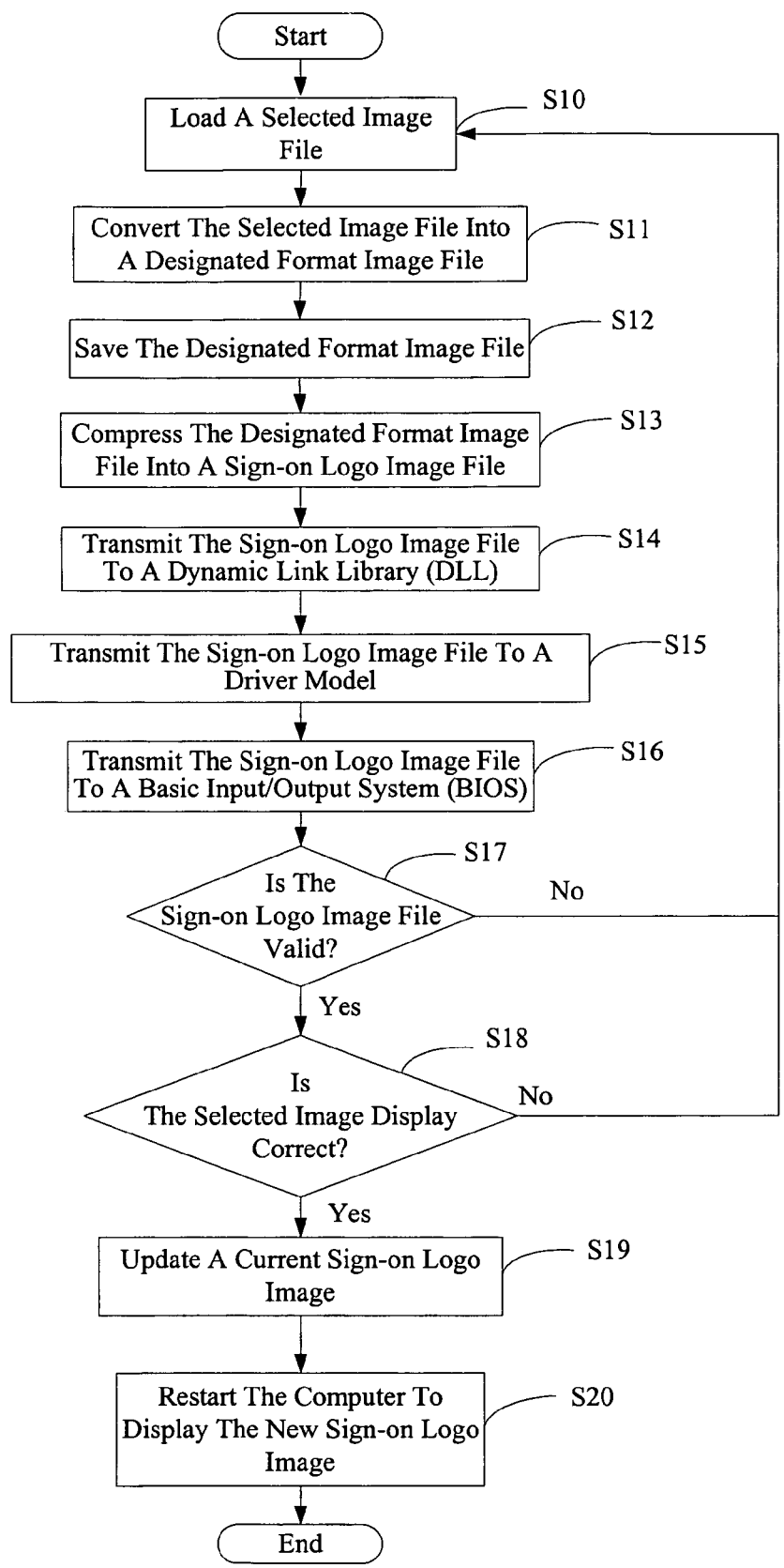
FIG. 3 is a flow chart of the preferred method for updating a sign-on logo image file and displaying the updated image file, by utilizing the system of FIG. 1.

FIG. 3 is a flow chart of the preferred method for updating a sign-on logo image file and displaying the updated image file, by utilizing the system. In step S10, the image loading module 11 loads a selected image file from the storage medium 7. In step S11, the image converting module 12 converts the selected image file into a designated format image file. In step S12, the image saving module 13 saves the designated format image file in the storage medium 7. In step S13, the image compressing module 14 compresses the designated format image file into a sign-on logo image file. In step S14, the communicating module 15 transmits the sign-on logo image file to the DLL 2. In step S15, the DLL 2 transmits the sign-on logo image file to the driver model 3. In step S16, the driver model 3 transmits the sign-on logo image file to the BIOS 4. In step S17, the BIOS 4 determines whether the sign-on logo image file is valid according to designated standards of the BIOS 4, such as a size of the sign-on logo image file. If the sign-on logo image file is not valid, the procedure returns to step S10 described above. In contrast, if the sign-on logo image file is valid, in step S18, the image previewing module 16 previews the selected image file, namely a new sign-on logo image file, on the windowed interface, to determine whether the new sign-on logo image display is correct. If the determination is "yes," in step S19, the BIOS 4 updates a current sign-on logo image file with the selected image file. In contrast, if the determination is "no," the procedure returns to step S10. In step S20, the computer is restarted, and the new sign-on logo image file, namely the selected image file, is displayed.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for updating a sign-on logo image file in a computer, comprising:

a storage medium for storing various kinds of image files;

application software for loading a selected image file, converting the selected image file into a designated format image file, and compressing the designated format image file into a corresponding sign-on logo image file;

a dynamic link library (DLL) for receiving the sign-on logo image file from the application software;

a basic input/output system (BIOS) for receiving the sign-on logo image file from the DLL through a driver model which connects the DLL with the BIOS, determining whether the sign-on logo image file are valid according a size of the sign-on logo image file, and updating the sign-on logo image file in the computer if the sign-on logo image file is valid; and a read only memory for storing the sign-on logo image file.

2. The system according to claim 1, wherein the application software comprises:

an image loading module for loading the selected image file from the storage medium;

an image converting module for converting the selected image file into the designated format image file;

an image compressing module for compressing the designated format image file into the sign-on logo image file; and a communicating module for transmitting the sign-on logo image file to the DLL.

3. The system according to claim 2, wherein the application software further comprises:

an image saving module for saving the designated format image file in the storage medium.

4. The system according to claim 2, wherein the application software further comprises:

an image previewing module for previewing a display of the selected image file before updating the sign-on logo image file.

5. The system according to claim 2, wherein the system is connected with a remote server through a network, the remote server controlling the application software through the network.

6. A computer-based method for updating a sign-on logo image file in a computer and displaying the updated image file, comprising the steps of:

loading a selected image file from a storage medium;

converting the selected image file into a designated format image file;

compressing the designated format image file into a sign-on logo image file;

transmitting the sign-on logo image file to a dynamic link library (DLL);

transmitting the sign-on logo image file to a basic input/output system (BIOS) through a driver model;

determining whether the sign-on logo image file is valid according to a size of the sign-on logo image file;

updating the sign-on logo image file stored in a read only memory (ROM) with the selected image file, if the sign-on logo image file is valid;

returning to the step of loading a selected image file, if the sign-on logo image file is not valid; and restarting the computer to display the selected image file.

7. The method according to claim 6, further comprising the step of:

saving the designated format image file in the storage medium.

8. The method according to claim 6, further comprising the steps of:

previewing the selected image file to determine whether the display of the selected image file is correct;

returning to the step of loading a selected image file, if the display of the selected image file is not correct; and updating the sign-on logo image file stored in the ROM with the selected image file, if the display of the selected image file is correct.

9. A method for updating and displaying a sign-on logo image file of a computer, comprising the steps of:

initializing a graphic interface under an operating system (OS) environment;

loading a selected image file from a storage medium of said computer via said graphic interface;

updating said sign-on logo image file stored in a read only memory (ROM) of said computer with said selected image file; and restarting said computer to display said updated sign-on logo image file.

10. The method according to claim 9, further comprising the step of previewing said updated sign-on logo image file via said graphic interface before said restarting step.

11. The method according to claim 9, further comprising the step of transmitting said image file to said ROM via a basic input/output system (BIOS) which acquires said image file through a dynamic link library (DLL) and a driver model before said updating step.

12. The method according to claim 11, further comprising the step of verifying validity of said image file by said BIOS.

13. The method according to claim 9, wherein said OS is one of the group consisting of Windows 98, Windows 2000, Windows XP, and other graphic-interface OSs.

14. The method according to claim 9, further comprising the step of connecting to a remote server through a network and allowing users of said remote server to remotely control fulfillment of said method via said graphic interface.

* * * * *